June 11, 1935.  E. F. ROSSMAN  2,004,539
SHOCK ABSORBER
Filed Sept. 15, 1933  2 Sheets-Sheet 1
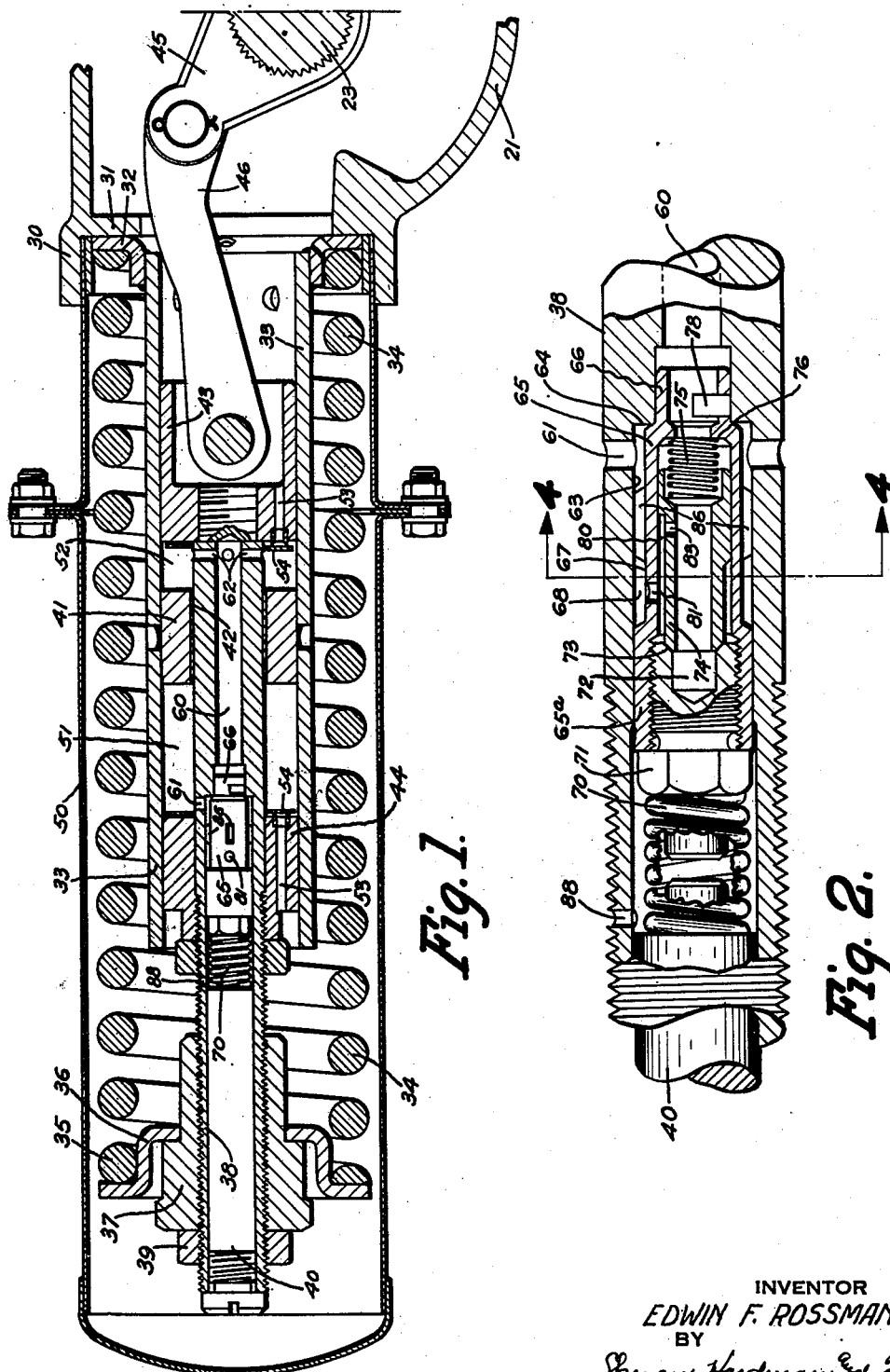
INVENTOR
EDWIN F. ROSSMAN
BY
ATTORNEYS June 11, 1935.  E. F. ROSSMAN  2,004,539
SHOCK ABSORBER
Filed Sept. 15, 1933   2 Sheets-Sheet 2
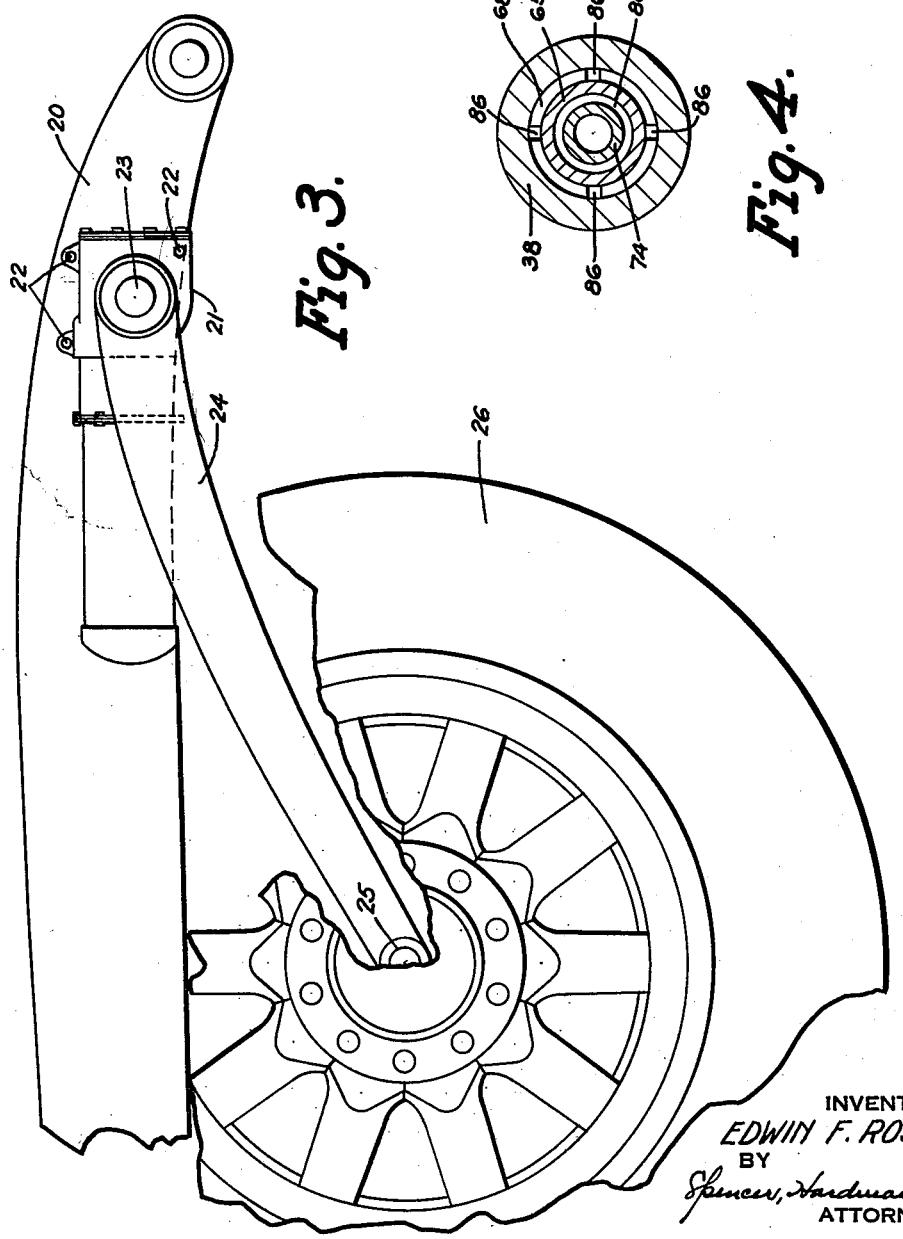
INVENTOR
EDWIN F. ROSSMAN
BY
ATTORNEYS Patented June 11, 1935

2,004,539

UNITED STATES PATENT OFFICE 2,004,539

SHOCK ABSORBER

Edwin F. Rossman, Dayton, Ohio, assignor, by mesne assignments, to General Motors Corporation, Detroit, Mich., a corporation of Delaware Application September 15, 1933, Serial No. 689,628

10 Claims. (Cl. 267—20)

This invention relates to improvements in suspending and shock absorbing devices for vehicles.

It is among the objects of the present invention to provide a suspending and shock absorbing device in which a coil spring resiliently supports the frame of the vehicle upon a wheel thereof.

A further object of the invention is to provide said device with means that substantially compels the several convolutions of the coil spring to move in a path coaxially of the entire spring, thereby preventing buckling or tilting of the spring as it is compressed or expanded in response to the approaching or separating movements of the frame and wheel respectively.

A still further object of the present invention is to utilize the aforementioned means to provide a shock absorber adapted to cushion or control said relative movements of the vehicle frame and wheel.

Further objects and advantages of the present invention will be apparent from the following description, reference being had to the accompanying drawings wherein a preferred embodiment of one form of the present invention is clearly shown.

In the drawings:

Fig. 1 is a fragmentary, longitudinal sectional view of the suspending and shock absorbing device.

Fig. 2 is an enlarged fragmentary sectional view of the fluid flow controlling portion of the device.

Fig. 3 is a fragmentary side view of a vehicle chassis with the device of the present invention shown applied thereto.

Fig. 4 is a detail transverse sectional view taken along the line 4—4 of Fig. 2.

Referring to the drawings and more particularly to Fig. 3, the frame of the vehicle is designated by the numeral 20. The suspending, shock absorbing device comprises a housing 21 adapted to be attached to the frame 20 of the vehicle by bolts 22. This housing rotatably supports a transverse shaft 23 so that the axis thereof is substantially at right angles to the vehicle frame 20. One end of this shaft extends outside the casing 21 and has one end of the arm 24 secured thereto so that oscillations of the arm 24 will rotate shaft 23. At the opposite end of said arm 24 there is provided a spindle 25 which rotatably supports the wheel 26 of the vehicle.

The casing 21 has a cup-shaped extension 30 in which there is an inwardly extending flange providing a ledge 31 upon which the outwardly extending annular flange 32 of the cylinder 33 rests. This cylinder 33 extends coaxially of a coil spring 34, one end convolution of said spring resting upon the flange 32 of the cylinder 33. The convolution 35, at the opposite, free end of spring 34, is engaged by a cup-shaped member 36, forming an abutment member for a nut 37 which is screwed upon a tubular rod 38. In order to secure nut 37 in proper position upon the tubular rod 38, a lock nut 39 is provided thereon. The end of the tubular link 38 more adjacent nut 37 is closed and sealed by a plug 40, having a portion threadedly engaging link 38.

The tubular link 38 is slidably supported within the cylinder 33 by a stationary partition 41 fixed substantially midway between the ends of the cylinder, a bearing 42 being provided within the central aperture of said partition in which bearing the tubular link 38 slides. A piston 43 is attached to the closed end of the tubular link 38, more adjacent the flange 32 of cylinder 33, while another piston 44 is secured to the link 38 on the side of the partition 41 opposite piston 43.

A lever 45 is secured to shaft 23 within the casing 21, this lever 45 being connected with piston 43 through a link 46. From this it may be seen that the rotatable shaft 23 is connected with the free end 35 of spring 34 by the following elements: lever 45, link 46 which in turn is connected with piston 43, said piston being attached to one end of the tubular link 38 having the nut 37 screwed thereupon, which nut rests against the abutment member 36 engaged by the free end of spring 35. Thus as shaft 23 is rotated clockwise, the connection between it and the free end 35 of spring 34 will tend to compress the spring while counter-clockwise rotation of shaft 23 will permit the spring to expand. The spring 34, resting against the flange 32 of cylinder 33, will maintain said cylinder substantially rigidly upon the ledge 31 of casing 21, the flange 32 being so shaped that the cylinder 33 extends into and is held substantially coaxially of the spring 34. It may clearly be seen that if a single, rigid rod would be used to connect lever 45 with the free end 35 of spring 34 there would be a tendency of the spring 34 to tilt or buckle as it is compressed and expanded by movement of the lever 45 due to the circular movement of the link end connected to lever 45. However, pistons 43 and 44, slidably supported within the immovable cylinder 34, being secured to the link 38 forming one portion of the connection between lever 45 and free end 35 of the spring 34, provide a type of cross-head which substantially prevents buckling or tilting of spring 34 inasmuch as said pistons as they slide in the cylinder 33 concentric with spring 34 will substantially compel the several convolutions of the spring to move in a path coaxially of the entire spring.

From the aforegoing it will be seen that spring 34 resiliently supports the frame 20 upon wheel 26 and thus when the wheel is forced toward the frame 20, due to the striking of an obstruction in the roadway, spring 34 will be compressed in response to the resulting clockwise rotation of the shaft 23 by the arm 24.

The approaching and separating movements of the frame and wheel of the vehicle must be cushioned or controlled to provide a comfortable ride, and thus applicant in providing a device to control said movements has used portions of the suspending device to complete an hydraulic shock absorber capable of cushioning or controlling said relative movements between the frame and wheel of the vehicle. A cylindrical cover or casing 50 is secured to casing 21, the open end of said casing 50 fitting into the cup-shaped extension 30. The casing 50 and casing 21 together form a fluid reservoir for the shock absorber.

The fluid displacement chambers of the shock absorber are provided between the two pistons 43 and 44 and the stationary partition 41, the chamber 51 being designated the "spring compression control chamber" and chamber 52 the "spring rebound control chamber". Each piston has a through passage 53, the fluid flow through which is controlled by any suitable one-way valve 54 on each piston so that as the piston moves to increase the size of its respective compression chamber, fluid may flow from the reservoir into the respective compression chamber, but as the piston moves to decrease the size of its respective compression chamber these valves 54 will act to prevent fluid flow from said chamber through the respective piston passage 53.

The two chambers 51 and 52 are connected through a passage 60 in the link 38, the cross passage 61 connecting chamber 51 with the passage 60, while the cross passage 62 connects chamber 52 with said passage 60. It will be seen in Fig. 1 that passage 60 terminates before it reaches the end of the link 38 secured in piston 43.

In order more clearly to understand the detailed construction of this fluid flow control mechanism, reference will now be had to the enlarged Fig. 2.

The passage 60, as may clearly be seen in Figs. 1 and 2, has a portion 63 of increased diameter, thus providing a shoulder 64 forming a valve-seat. Within the passage portion 63 a tubular valve 65 is slidably supported, the one end of this valve having a reduced diameter portion 66 which fits slidably into the passage portion 60. Between the portion 66 of the valve 65 and the end 65a which slidably fits into passage portion 63 of link 38, there is a reduced diameter portion 67 forming an annular chamber 68 within the passage 63. The direct communication between annular chamber 68 and passage portion 60 is cut off by the portion 66 of valve 65 when said valve is in normal position as shown in Figs. 1 and 2. The valve is yieldably maintained in this normal position by a spring 70 interposed between the inner end of plug 40 and a similar plug 71 threaded into the adjacent end of the valve 65, said plug 71 closing this end of the tubular valve 65. The threaded body portion of the screw plug 71, fitting into the valve 65, has a recess 72 providing an annular shoulder forming a valve-seat 73 which is engaged by the tapered end of a valve 74 slidably carried within the tubular valve 65. This valve 74 is normally maintained upon seat 73 by a spring 75 interposed between valve 74 and an interior shoulder 76 provided in the valve 65 adjacent its tubular end 66. As shown in Fig. 2, the tubular end 66 has a side opening 78 normally lying within the confines of the passage 60, however, being adapted to be uncovered so as to form communication between passage 60 and the annular chamber 68 when the valve 65 is movable longitudinally of the member 38 against the effect of spring 70. Valve 74 has a reduced diameter portion forming an annular chamber 80 within the hollow valve 65. This annular chamber is in communication with the annular chamber 68 through an orifice 81 in the valve 65. Annular chamber 80 is also in communication with the interior of valve 74 through the orifice 83. In order to guide the sliding movement of valve 65 within the passage 63 of the link rod 38, spaced ribs 86 are provided on the valve 65, said spaced ribs running longitudinally of the valve and thus not impeding fluid flow through the annular chamber 68 provided between valve 65 and the inner wall of passage 63. The interior of passage 63 containing spring 70 is in communication with the reservoir through a passage 88 so that action of the valve 65 toward the screw plug 40 will not be impeded by the compression of fluid within this chamber.

As has been mentioned heretofore, when the wheel of the vehicle strikes an obstruction in the roadbed and is thrust upwardly, in response thereto, toward the frame 20 of the vehicle, shaft 23 will be rotated clockwise as regards Figs. 1 and 3, thereby moving the motion transmitting means including piston 43, link 38 and its abutment member 36 toward the right as regards Fig. 1, consequently compressing spring 34. Under these circumstances piston 44 will be moved toward the stationary partition 41 and will exert pressure upon the fluid within the chamber 51, forcing it through the orifice or opening 61 in the tubular rod 38, into the annular chamber 68. From here said fluid will flow through the orifice 81 in valve 65, into the annular chamber 80 and from there through the orifice 83 in valve 74, into the interior of said valve, passing through valve 65 and its cylindrical end 66 into the passage 60, from where said fluid will flow through cross passages 62 into the chamber 52, which is being enlarged as piston 43 is moved away from partition 41. If the smaller orifice 83 will not properly relieve the pressure within chamber 51, then the fluid pressure within the annular chamber 80 will exert a force against the end wall in chamber 80 formed by the valve 74, thereby moving said valve 74 against the effect of spring 75 so that its tapered end will be moved out of engagement with the seat 73. Now a flow of fluid is established from the chamber 80 through the orifice presented between the tapered end of valve 74 and its seat 73 into the recess 72 of plug 71, thence through the valve 74 and the cylindrical end 66 of valve 65 into the passage 60. The restriction offered to the flow of fluid past the seat 73 will tend to resist the movement of the piston 44 toward the right as regards Fig. 1 and consequently the approaching movement of the wheel 26 toward the frame 20 is resisted.

Compressed spring 34 by its reaction will tend to lift the vehicle frame 20, causing a reverse movement of pistons 43 and 44, such a movement resulting also from the action of the wheel as it rides down the obstruction to the even level of the roadbed over which the vehicle is being operated. Now, as the piston 43 moves toward the stationary partition 41, pressure is exerted upon the fluid within chamber 52, thus urging the fluid through passage 62 into passage 60. The first flow of fluid from passage 60 is established through the cylindrical portion 66 of valve 65 into the interior of valve 74, then through the orifice 83 into annular duct 80, through passage 81 in valve 65 into the annular chamber 68, thence through opening 61 in the tubular link 38 into chamber 51. The restriction offered to this flow of fluid by the orifice 83 tends to resist, to a predetermined degree, the movement of the piston 43 toward the left as regards Fig. 1. If the pressure within chamber 52 becomes excessive so that it cannot properly be relieved by the fluid flow through orifice 83, then valve 65 is moved bodily against the effect of spring 70 so that its cylindrical portion 66 is pushed from the passage 60 toward the enlarged passage 63 of said passage, thereby uncovering side opening 76 in said cylindrical portion 66 and establishing a flow of fluid from passage 60 through the side opening directly into the annular passage 68 from where it flows through the opening 61 in the tubular link into the chamber 51, which is being enlarged by the movement of the piston 44 away from partition 41.

From the foregoing it may be seen that the movement of valve 74 together with the initial control of fluid flow by orifice 83 regulates fluid flow on the compression stroke of the shock absorber, that is, the stroke of the shock absorber toward the right to compress spring 34, consequently resisting the approaching movements of the wheel toward the frame. On the other hand orifice 83 provides initial control of fluid flow and the movement of valve 65 restricts fluid flow from chamber 52 on the rebound stroke of the shock absorber or more specifically the movement of the shock absorber in response to the separating movements of the wheel and frame of the vehicle.

The motion transmitting connection between lever 25 and the free end 35 of the spring 34 includes shock absorber elements or pistons 43 and 44 slidably supported within the shock absorber cylinder 33, thus offering a guide to maintain the action of the spring along its axis as well as offering fluid displacement members and fluid flow controlling means for the shock absorber. Thus the shock absorber elements 43, 44, 41 and 38 have a two-fold function, first providing a cross-head to guide the movement of the spring, and second, providing operating elements of a motion controlling device or shock absorber. As has been said before, without the guide to hold the movement of the motion transmitting means coaxially of the spring, compression of the spring would tend to tilt it in one direction or another and thus cause it to strike the covering 50.

While the form of embodiment of the present invention as herein disclosed, constitutes a preferred form, it is to be understood that other forms might be adopted, all coming within the scope of the claims which follow:

What is claimed is as follows:

1. In a suspending and shock absorbing device for a vehicle, the combination with the frame and a wheel of the vehicle, an arm hingedly secured to the frame and having a spindle for supporting the wheel; a coil spring; a motion transmitting member secured to the arm and the free end of the coil spring; and means comprising a cylinder rigidly supported coaxially of the spring and a plurality of spaced members, one of which is secured within the cylinder, the others being slidable within the cylinder and fixed to the motion transmitting member for preventing tilting of the spring and providing a shock absorber for controlling the movements of the wheel supporting arm.

2. In a suspending and shock absorbing device for a vehicle, the combination with the frame and a wheel of the vehicle, an arm having a stub shaft at its one end, pivotally supported by the frame and a spindle at its other end for supporting the wheel; a motion transmitting means attached at one end to the arm; a coil spring having one end resting against the frame, the other, free end being engaged by the other end of the motion transmitting means whereby said spring resiliently opposes movement of the wheel toward the frame; and means comprising a stationary, fluid containing cylinder in which plugs are provided, one of which is secured to the cylinder, others being reciprocative and providing pistons therein, said pistons being attached to the motion transmitting means, said cylinder and plugs providing a guide and a shock absorber for the motion transmitting means.

3. In a suspending and shock absorbing device for a vehicle, the combination with the frame and a wheel of the vehicle; a casing attached to the frame; a shaft journaled in the casing; an arm attached to the shaft, said arm providing a spindle for supporting the wheel; a coil spring having one end resting upon the casing; motion transmitting means attached at one end to the free end of the spring and at the opposite end to the arm; and means for preventing buckling of the spring and providing a shock absorber for controlling the movements of the arm, said means comprising a cylinder extending coaxially into the coil spring and having slidable pistons therein which are attached to the motion transmitting means.

4. In a suspending and shock absorbing device for a vehicle, the combination with the frame and a wheel of the vehicle; a casing attached to the frame; a shaft journaled in the casing; an arm attached to the shaft, said arm providing a spindle for supporting the wheel; a coil spring; a cylinder extending coaxially into the coil spring and clamped upon the casing by said spring; motion transmitting means attached at one end to the free end of the spring and at the other end to the arm; a cover enclosing the spring and attached to the casing, said cover with said casing containing a fluid; and pistons in said cylinder, attached to the motion transmitting means, and providing means for preventing buckling of the spring and fluid displacement members of the shock absorber that controls movements of the arm.

5. In a suspending and shock absorbing device for a vehicle, the combination with the frame and a wheel of the vehicle; a casing attached to the frame; a shaft journaled in the casing; an arm attached to the shaft, said arm providing a spindle for supporting the wheel; a coil spring; a cylinder extending coaxially into said coil spring, said cylinder having an outwardly extending flange at its one end engaged by the spring and clamped by it against the casing; a stationary, apertured partition within said cylinder; a rod slidably carried by the partition and having its one end attached to the spring; a piston attached to said rod on each side of the partition; means connecting one of the pistons on the rod to the arm; fluid flow controlling means in the rod between the two pistons; and a fluid containing cover about the spring and attached to the casing.

6. In a suspending and shock absorbing device for a vehicle, the combination with the frame and a wheel of the vehicle; a casing attached to the frame; a shaft journaled in the casing; an arm attached to the shaft, said arm providing a spindle for supporting the wheel; a coil spring; a cylinder extending coaxially into said coil spring, said cylinder having an outwardly extending flange at its one end engaged by the spring and clamped by it against the casing; a stationary, apertured partition within said cylinder; a rod attached at one end to the free end of the spring and extending coaxially into the cylinder, said rod being slidably supported by the partition; pistons slidably carried in the cylinder, attached to the rod and providing a chamber on each side of the partition; valved passages in the rod connecting said chambers; a link connecting the one piston on the rod to the arm; and a fluid containing cover about the spring and attached to the casing.

7. In a suspending and shock absorbing device for a vehicle, the combination with the frame and a wheel of a vehicle; an arm having a wheel supporting spindle at one end and a shaft pivotally carried by the frame at its opposite end; a coil spring supported at one end upon the frame; motion transmitting means connecting the arm and free end of the spring; and a shock absorber comprising a stationary cylinder, containing reciprocating fluid displacement members attached to the motion transmitting means and a stationary partition secured within the cylinder between said members and slidably supporting said motion transmitting means, said members and partition providing both a guide and a movement controlling device for said means.

8. In a suspending and shock absorbing device for a vehicle, the combination with the frame and a wheel of a vehicle; an arm having a wheel supporting spindle at one end and a shaft pivotally carried by the frame at its opposite end; a coil spring supported at one end upon the frame; motion transmitting means connecting the arm and free end of the spring; and a shock absorber comprising a stationary cylinder extending coaxially into said coil spring, said cylinder having a stationary partition slidably carrying the motion transmitting means and a fluid displacement member on each side of the partition which is attached to a part of the motion transmitting means, said cylinder, partition and displacement members also providing a guide for maintaining the movement of said means coaxially of the coil spring to eliminate buckling thereof.

9. In a suspending and shock absorbing device for a vehicle, the combination with the frame and a wheel of the vehicle; an arm pivotally carried by the frame and providing a spindle for supporting the wheel; a coil spring supported at one end by the frame; motion transmitting means connected between the arm and the free end of the spring; and a hydraulic shock absorber comprising a stationary cylinder extending into the spring and having the motion transmitting means extending therethrough, two spaced pistons on the said means and a partition in the cylinder between said pistons, slidably supporting the motion transmitting means, and valved fluid flow ducts in said means connecting the chambers between the partition and each piston.

10. In a suspending and shock absorbing device for a vehicle, the combination with the frame and a wheel of the vehicle; an arm pivotally supported by the frame and providing a wheel supporting spindle; a coil spring supported at one end by the frame; motion transmitting means interposed between the arm and the free end of the spring; and a hydraulic shock absorbing device comprising a stationary cylinder through which the motion transmitting means extends, a stationary partition secured within the cylinder and slidably supporting said motion transmitting means, two pistons in the cylinder, secured to said motion transmitting means and forming fluid displacement chambers on each side of the partition, fluid transfer between which is controlled by fluid flow controlling means in the motion transmitting means, said cylinder, partition and pistons providing also a guide to maintain the movement of said means coaxial of the cylinder and prevent the spring from buckling.

EDWIN F. ROSSMAN.